US006442857B1

(12) United States Patent
Atsuhiko et al.

(10) Patent No.: US 6,442,857 B1
(45) Date of Patent: Sep. 3, 2002

(54) PORTABLE SURFACE INSPECTOR

(75) Inventors: Kasukawa Atsuhiko; Nakayama Yasuo; Uchimura Takeshi, all of Kitakyushu (JP)

(73) Assignee: Toto Ltd., Fukuoka-ken (JP)

( * ) Notice: Subject to any disclaimer, the term of this patent is extended or adjusted under 35 U.S.C. 154(b) by 54 days.

(21) Appl. No.: 09/749,668

(22) Filed: Dec. 28, 2000

(51) Int. Cl.[7] ................................................. G01B 5/20
(52) U.S. Cl. ............................ 33/553; 33/533; 33/1 M; 33/503
(58) Field of Search .......................... 33/553, 554, 555, 33/503, 1 M, DIG. 21, 556, 558, 559, 561

(56) References Cited

U.S. PATENT DOCUMENTS

| | | | | |
|---|---|---|---|---|
| 4,397,188 A | * | 8/1983 | Bansevichus et al. | 33/561 |
| 4,785,675 A | * | 11/1988 | Takasu et al. | 73/862.324 |
| 4,805,314 A | * | 2/1989 | Hayashi et al. | 33/1 M |
| 5,024,002 A | * | 6/1991 | Possati | 33/552 |
| 5,148,600 A | * | 9/1992 | Chen et al. | 33/1 M |
| 5,189,806 A | * | 3/1993 | McMurtry et al. | 33/503 |
| 5,419,056 A | * | 5/1995 | Breitenstein | 33/549 |
| 5,542,188 A | * | 8/1996 | Ertl et al. | 33/549 |
| 5,579,246 A | * | 11/1996 | Ebersbach et al. | 33/503 |
| 5,621,978 A | * | 4/1997 | Sarauer | 33/1 M |
| 5,758,429 A | * | 6/1998 | Farzan et al. | 33/1 MP |
| 5,768,798 A | * | 6/1998 | Takahashi et al. | 33/556 |
| 5,778,549 A | * | 7/1998 | Campanile | 33/503 |
| 5,806,199 A | * | 9/1998 | King | 33/552 |
| 5,825,666 A | * | 10/1998 | Freifeld | 33/503 |
| 5,848,480 A | * | 12/1998 | Sola et al. | 33/503 |
| 5,864,238 A | * | 1/1999 | Iijima et al. | 324/519 |
| 5,886,775 A | * | 3/1999 | Houser et al. | 356/4.01 |
| 5,949,352 A | * | 9/1999 | Ferrari | 33/558 |
| 6,026,583 A | * | 2/2000 | Yoshizumi et al. | 33/503 |
| 6,029,118 A | * | 2/2000 | Strasser | 33/706 |
| 6,041,511 A | * | 3/2000 | Broghammer | 33/503 |
| 6,044,569 A | * | 4/2000 | Ogihara et al. | 33/503 |
| 6,061,922 A | * | 5/2000 | Tzeng | 33/502 |
| 6,163,973 A | * | 12/2000 | Matsumiya et al. | 33/503 |
| 6,169,290 B1 | * | 1/2001 | Rosberg et al. | 33/533 |
| 6,182,369 B1 | * | 2/2001 | Hirano et al. | 33/1 M |
| 6,253,460 B1 | * | 7/2001 | Schmitz | 33/706 |
| 6,272,763 B1 | * | 8/2001 | Yamaguchi et al. | 33/1 M |
| 6,311,624 B1 | * | 11/2001 | Theurer et al. | 33/287 |
| 6,366,866 B1 | * | 4/2002 | Kanagawa et al. | 33/503 |
| 6,367,159 B1 | * | 4/2002 | Naoi et al. | 33/551 |

FOREIGN PATENT DOCUMENTS

| | | |
|---|---|---|
| JP | 63-037288 A | 2/1988 |
| JP | 2-009572 A | 1/1990 |
| JP | 5-149739 A | 6/1993 |
| JP | 7-190747 A | 7/1995 |
| JP | 7-229733 A | 8/1995 |

OTHER PUBLICATIONS

TOTO LTD., Instruction Manual for Portable Surface Inspector, published in Japan, Jan. 2000.

* cited by examiner

*Primary Examiner*—Diego Gutierrez
*Assistant Examiner*—Yaritza Guadalupe
(74) *Attorney, Agent, or Firm*—Griffin & Szipl, P.C.

(57) ABSTRACT

A portable surface inspector comprises a straight guide rail, a table engaging the guide rail to be movable along the guide rail, a stage engaging the table to be movable in the direction of a transverse axis crossing at right angles with the longitudinal axis of the guide rail, a non-contact displacement sensor fixed to the stage, a first driving means for driving the table, a first coordinate detecting means for detecting the longitudinal axis coordinate of the non-contact displacement sensor, a second driving means for driving the stage, a second coordinate detecting means for detecting the transverse axis coordinate of the non-contact displacement sensor, and a coordinate correcting means for correcting the transverse axis coordinate of the non-contact displacement sensor with the deflection in the direction of the transverse axis of the guide rail.

21 Claims, 13 Drawing Sheets

$Zn = (Zs, Zi, \Delta Z)$

PORTABLE SURFACE INSPECTOR

BACKGROUND OF THE INVENTION

The present invention relates to a portable surface inspector for surface inspection of a flat body, especially a lapping plate.

A lapping plate used for precise processing of brittle materials, the curved surface of a GMR head, etc. has a curved or straight processing surface provided with a fine spiral groove. The processing surface must be kept in good condition macroscopically and microscopically so as to maintain high processing accuracy. The processing surface must be accurately inspected macroscopically and microscopically so as to keep it in good condition macroscopically and microscopically.

Surface inspection of the processing surface of a lapping plate has been carried out with the following inspecting apparatuses.

A. Inspection of macroscopic shape of processing surface such as flatness, sphericity, etc.
  a. Span gauge
  b. Three-coordinate measuring machine
  c. Comparator, Dial gauge
B. Inspection of microscopic shape of processing surface such as groove shape, etc.
  a. Surface roughness tester
  b. Scanning electron microscope There have been the following problems with the conventional inspecting apparatuses.

Span gauge: Local deformation is liable to be overlooked because a span gauge carries out point inspection.

Three-coordinate measuring machine, Comparator, Dial gauge: The processing surface of a lapping plate detached from the lapping machine can be inspected but the processing surface of a lapping plate attached to the lapping machine cannot be inspected.

Surface roughness tester: Spherical surfaces are hard to inspect because the inspectable range in the direction of the Z-axis (axis extending in the direction of the thickness of a flat body) is less than 1 mm.

Scanning electron microscope: Wide surfaces are hard to inspect because the inspection speed is very low.

Contact type surface inspectors such as the span gauge, three coordinate measuring machine, surface roughness tester, comparator, etc. cannot carry out accurate inspection of the processing surface of a lapping plate made of soft metal such as tin and are liable to damage the processing surface.

SUMMARY OF THE INVENTION

An object of the present invention is to provide a portable surface inspector which can inspect easily and accurately the macroscopic shape and the microscopic shape of the processing surface of a lapping plate attached to a lapping machine.

Another object of the present invention is to provide a portable surface inspector which can inspect easily and accurately the macroscopic shape and the microscopic shape of the surface of a flat body.

In accordance with the present invention, there is provided a portable surface inspector comprising a straight guide rail, a table engaging the guide rail to be movable along the guide rail, a stage engaging the table to be movable in the direction of a transverse axis crossing at right angles with the longitudinal axis of the guide rail, a non-contact displacement sensor fixed to the stage, a first driving means for driving the table, a first coordinate detecting means for detecting the longitudinal axis coordinate of the non-contact displacement sensor, a second driving means for driving the stage, a second coordinate detecting means for detecting the transverse axis coordinate of the non-contact displacement sensor, and a coordinate correcting means for correcting the transverse axis coordinate of the non-contact displacement sensor with the deflection in the direction of the transverse axis of the guide rail.

According to a preferred embodiment of the present invention, the portable surface inspector further comprises a constant distance keeping means for keeping the distance in the direction of the transverse axis between the non-contact displacement sensor and the inspected surface constant.

According to another preferred embodiment of the present invention, the non-contact displacement sensor is a laser sensor.

According to another preferred embodiment of the present invention, the portable surface inspector further comprises an air bearing supporting the table.

According to another preferred embodiment of the present invention, the guide rail is made of ceramic.

According to another preferred embodiment of the present invention, the portable surface inspector further comprises a measured surface shape data storing means and a measured surface data analyzing means.

According to another preferred embodiment of the present invention, the portable surface inspector further comprises an initial surface shape data storing means for storing the initial surface shape data of the inspected surface and a wear detecting means for detecting the wear of the inspected surface based on the initial surface shape data and the measured surface shape data.

According to another preferred embodiment of the present invention, the portable surface inspector further comprises a first warning means for displaying a warning when the wear of the inspected surface exceeds a permissible level.

According to another preferred embodiment of the present invention, the portable surface inspector further comprises a second warning means for displaying a warning when increment of the wear from that at the last inspection exceeds a permissible level.

According to another preferred embodiment of the present invention, the portable surface inspector further comprises a support member for the guide rail and a support member locating means for locating the support member relative to the surface to be inspected.

According to another preferred embodiment of the present invention, the guide rail is connected to the support member to be detachable.

According to another preferred embodiment of the present invention, the support member is provided with a plurality of legs of adjustable length.

According to another preferred embodiment of the present invention, the transverse axis coordinate of the non-contact displacement sensor at the home position is marked on the support member.

According to another preferred embodiment of the present invention, the transverse axis coordinate of the non-contact displacement sensor at the home position is marked on the support member locating means.

In accordance with the present invention, there is provided a method for inspecting the surface shape of a flat body comprising the steps of:

moving a non-contact displacement sensor movable along a straight guide rail to a first position in the direction of the longitudinal axis of the guide rail;

moving the non-contact displacement sensor to a second position in the direction of a transverse axis crossing at right angles with the longitudinal axis of the guide rail;

measuring the distance in the direction of the transverse axis between the non-contact displacement sensor and the surface to be inspected;

detecting the longitudinal axis coordinate of the first position of the non-contact displacement sensor;

detecting the transverse axis coordinate of the second position of the non-contact displacement sensor;

calculating the transverse axis coordinate of the inspected point of the inspected surface based on the distance in the direction of the transverse axis between the non-contact displacement sensor and the inspected surface, the transverse axis coordinate of the second position of the non-contact displacement sensor, and a correction value for correcting the transverse axis coordinate of the second position of the non-contact displacement sensor based on the deflection of the guide rail in the direction of the transverse axis; and carrying out the above steps at various different first positions of the non-contact displacement sensor.

According to a preferred embodiment of the present invention, the distance in the direction of the transverse axis between the non-contact displacement sensor and the surface to be inspected is kept constant.

According to another preferred embodiment of the present invention, the method for inspecting the surface shape of a flat body further comprises the steps of:

calculating the circular arc of the inspected surface based on the measured longitudinal axis coordinates and the transverse axis coordinates of a plurality of measured points; and displaying the radius R of the calculated circular arc.

According to another preferred embodiment of the present invention, the method for inspecting the surface shape of a flat body further comprises the steps of:

calculating the circular arc of the inspected surface based on the measured longitudinal axis coordinates and the transverse axis coordinates of a plurality of measured points;

calculating differences ΔR in the direction of the transverse axis between the calculated circular arc and the measured points; and displaying the differences ΔR.

According to another preferred embodiment of the present invention, the method for inspecting the surface shape of a flat body further comprises the steps of:

calculating the circular arc of the inspected surface based on the measured longitudinal axis coordinates and the transverse axis coordinates of a plurality of measured points;

calculating differences ΔR in the direction of the transverse axis between the calculated circular arc and the measured points;

calculating the difference ΔH between the maximum ΔR and the minimum ΔR; and displaying the difference ΔH.

According to another preferred embodiment of the present invention, the inspected surface is symmetrical around a rotation axis, and the method for inspecting the surface shape of a flat body further comprises the steps of:

calculating the circular arc of the inspected surface based on the measured longitudinal axis coordinates and the transverse axis coordinates of a plurality of measured points over a diameter of the inspected surface;

calculating the circular arc of the inspected surface based on the measured longitudinal axis coordinates and the transverse axis coordinates of a plurality of measured points over a radius of the inspected surface; and displaying the radius R of the circular arc calculated based on the measured points over the diameter and the radius R of the circular arc calculated based on the measured points over the radius.

According to another preferred embodiment of the present invention, the inspected surface is symmetrical around a rotation axis, and the method for inspecting the surface shape of a flat body further comprises the steps of:

calculating the circular arc of the inspected surface based on the measured longitudinal axis coordinates and the transverse axis coordinates of a plurality of measured points over a diameter of the inspected surface;

calculating the circular arc of the inspected surface based on the measured longitudinal axis coordinates and the transverse axis coordinates of a plurality of measured points over a radius of the inspected surface; and displaying the difference between the radius R of the circular arc calculated based on the measured points over the diameter and the radius R of the circular arc calculated based on the measured points over the radius.

Further objects, features and advantages of the present invention will become apparent from the Detailed Description of the Preferred Embodiments when read in conjunction with the accompanying drawings.

DETAILED DESCRIPTION OF THE PREFERRED EMBODIMENTS

Figure 1:
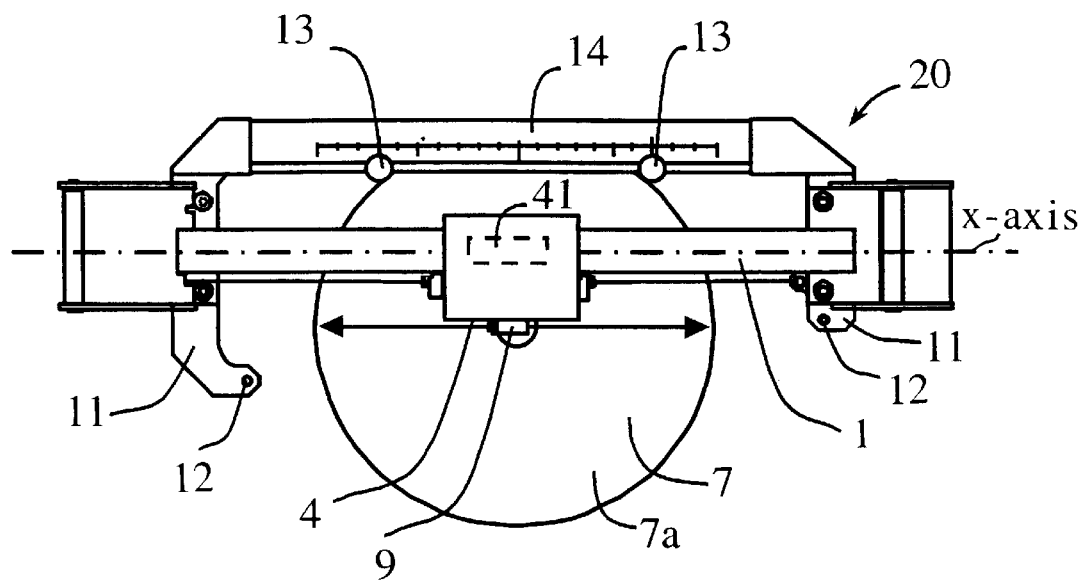
FIG. 1 is a plan view of a portable surface inspector in accordance with a preferred embodiment of the present invention.

A portable surface inspector in accordance with a preferred embodiment of the present invention will be described.

As shown in FIGS. 1 to 4, a portable surface inspector 20 in accordance with a preferred embodiment of the present invention is provided with a straight hollow guide rail 1 made of a material with a large Young's modulus per unit mass such as alumina ceramic, silicon carbide, etc. The guide rail 1 is supported at both ends by a pair of columns 10. The guide rail 1 and the pair of columns 10 are assembled as a unitary body.

An X-axis table 4 engages the guide rail 1 to be movable along the guide rail 1 in the direction of the longitudinal axis X of the guide rail 1. The X-axis table 4 is supported by the guide rail 1 through an air bearing 41.

The X-axis table 4 is driven by an X-axis motor 42. The X-axis table 4 is located at a home position in the vicinity of one end of the guide rail 1 when the portable surface inspector 20 is not in operation.

A Z-axis stage 3 engages the X-axis table 4 to be movable in the direction of Z-axis crossing at right angles with the X-axis. The Z-axis stage 3 is driven by a Z-axis motor 5. The Z-axis stage 3 is located at a home position in the vicinity of the X-axis when the portable surface inspector 20 is not in operation.

The Z-axis stage 3 is provided with a non-contact displacement sensor 9 such as capacitance type sensor, eddy current sensor, fiber sensor, laser sensor, etc. The non-contact displacement sensor 9 is desirably a laser sensor whose measuring spot size is small and measuring accuracy is high.

The guide rail 1 is provided with an X-axis linear scale 2 for detecting the X-axis coordinate of the non-contact displacement sensor 9. The X-axis table 4 is provided with a Z-axis linear scale 32 for detecting the Z-axis coordinate of the non-contact displacement sensor 9. Each linear scale includes a scale and a scale head for reading the scale.

The pair of columns 10 are detachably fixed to a pair of support tables 11 by a pair of connecting jigs 15. A plurality of support legs 12 are screwed in the support tables 11. Each support leg 12 is provide with a handle 17. A nut 18 is screwed on the support leg 12.

A scale 14 is disposed between the pair of support tables 11. The scale 14 extends parallel to the guide rail 1. The pair of support tables 11 and the scale 14 are assembled as a unitary body. A pair of locating jigs 13 engage the scale 14 to be movable in the direction of the longitudinal axis of the scale 14. Each locating jig 13 is provided with a portion 13a capable of engaging the scale 14, a portion 13b capable of abutting the side surface of an object to be inspected and a surface 13c capable of abutting the peripheral portion of the surface to be inspected. The distance in the direction of the Z-axis between the surface 13c and the non-contact displacement sensor 9 at the home position is set within the measurable distance range of the non-contact displacement sensor 9.

Figure 5:
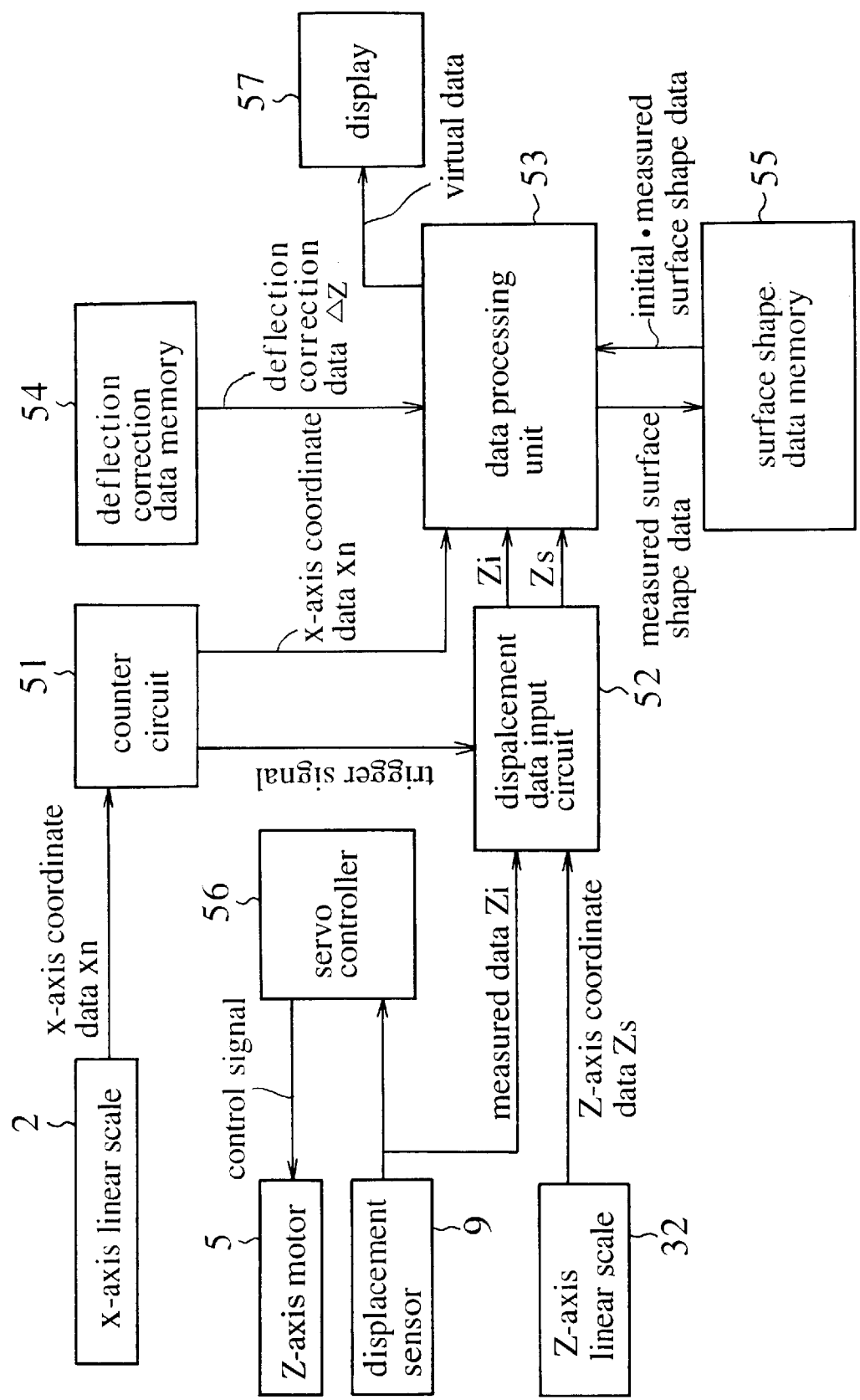
FIG. 5 is a block diagram of the data processor of a portable surface inspector in accordance with a preferred embodiment of the present invention.

As shown in FIG. 5, the portable surface inspector 20 is provided with a data processor having a counter circuit 51, a displacement data input circuit 52, a data processing unit 53, a deflection correction data memory 54, a surface shape data memory 55, a servo controller 56 and a display 57.

The procedure of the setting operation of the portable surface inspector 20 when a processing surface of a lapping plate installed on a lapping machine is inspected along a diameter line thereof with the portable surface inspector 20 will be described.

Figure 2:
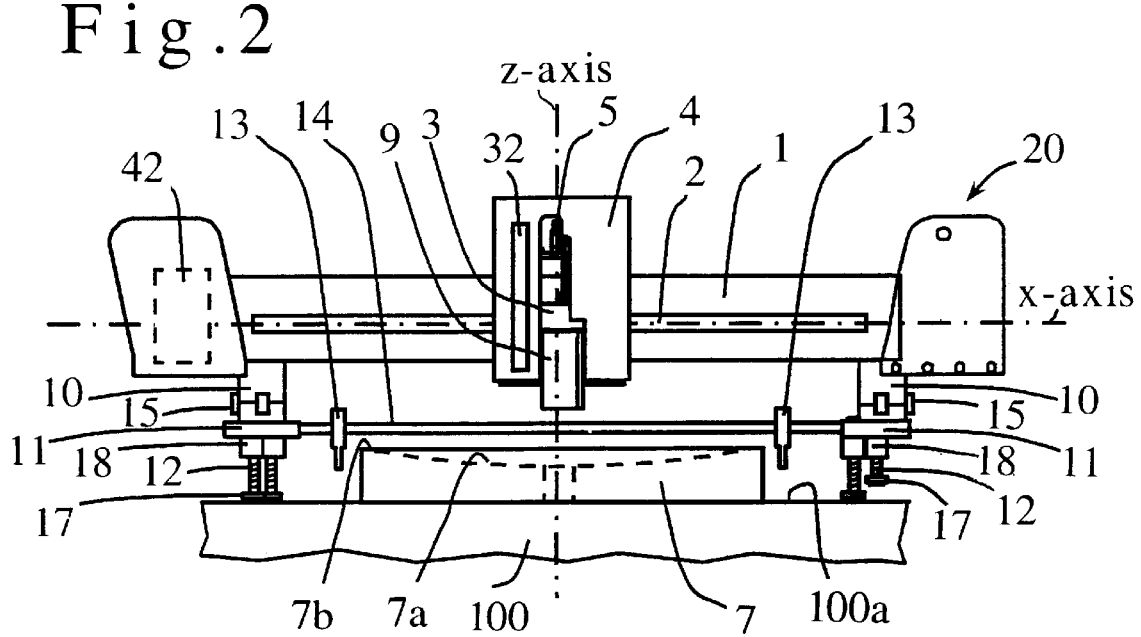
FIG. 2 is a side view of a portable surface inspector in accordance with a preferred embodiment of the present invention.
Figure 3:
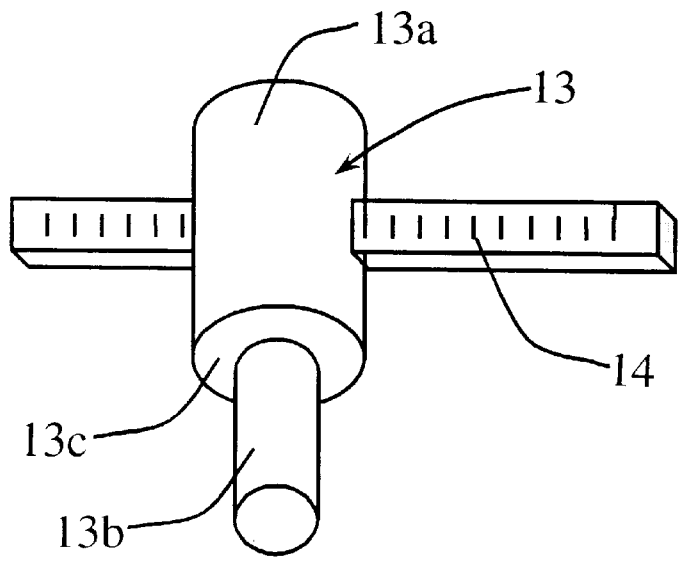
FIG. 3 is a perspective view of a locating jig of a portable surface inspector in accordance with a preferred embodiment of the present invention.
Figure 4:
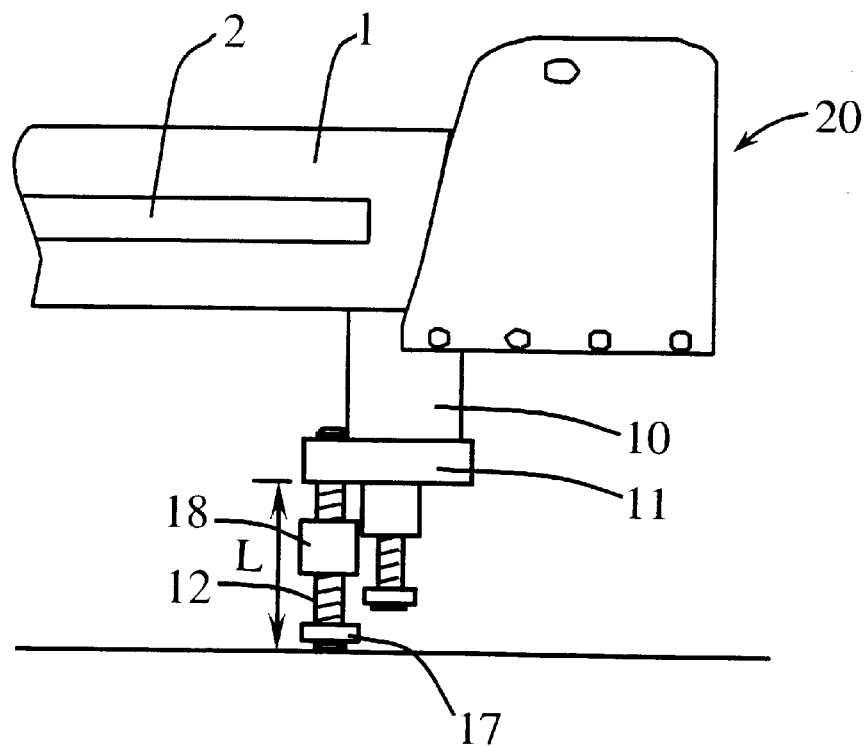
FIG. 4 is a side view of support legs of a portable surface inspector in accordance with a preferred embodiment of the present invention.

As shown in FIG. 2, an annular plate shaped lapping plate 7 is set on and fixed to a horizontal and flat upper surface 100a of a lapping machine 100. The lapping plate 7 is provided with a spherical processing surface 7a.

An operator operates the jigs 15 to divide the portable surface inspector 20 into a first portion including the guide rail 1 and a second portion including the support tables 11.

The operator adjusts the distance between the pair of locating jigs 13 based on the outer diameter of the lapping plate 7 and the horizontal distance in the direction at right angles with the guide rail 1 between the non-contact displacement sensor 9 and the portions 13b of the locating jigs 13, while referring to graduations of the scale 14, so that the non-contact displacement sensor 9 can move along a diameter line of the lapping plate 7.

The operator rotates the handles 17 to adjust the effective length L of the support legs 12 to make the surfaces 13c of the locating jigs 13 level with the periphery 7b of the lapping plate 7. The operator fastens the nuts 18 to fix the effective length L of the support legs 12 at the adjusted value.

The operator abuts the pair of portions 13b against the side surface of the lapping plate 7 and abuts the pair of surfaces 13c against the periphery 7b of the lapping plate 7 to set the second portion of the portable surface inspector 20 on the upper surface 100a of the lapping machine 100.

The operator sets the first portion of the portable surface inspector 20 on the second portion of the portable surface inspector 20 and operates the jigs 15 to fix the first portion to the second portion.

Thus, the setting operation of the portable surface inspector 20 is completed. After the completion of the setting operation, the guide rail 1 extends parallel to the upper surface 100a of the lapping machine 100, the non-contact displacement sensor 9 is located on a diameter line of the lapping plate 7, and the distance in the direction of the Z-axis between the non-contact displacement sensor 9 and the processing surface 7a of the lapping plate 7 is within the range of measurable distance of the non-contact displacement sensor 9.

The portable surface inspector 20 has the following advantages with respect to the setting operation thereof.

(1) The portable surface inspector 20 can be easily located relative to the lapping plate 7 with the locating jigs 13 so that the non-contact displacement sensor 9 can move along a diameter line of the lapping plate 7. The locating jigs 13 can be effectively used for objects to be inspected with various shapes and sizes.

(2) The distance in the direction of the Z-axis between the non-contact displacement sensor 9 and the processing surface 7a of the lapping plate 7 can be easily set within the range of measurable distance of the non-contact displacement sensor 9 by adjusting the effective length L of the support legs 12.

(3) Interference between the non-contact displacement sensor 9 at the home position and the processing surface 7a of the lapping plate 7 and also damage of the processing surface 7a due to interference during the setting operation of the portable surface inspector 20 can be prevented by adjusting the effective length L of the support legs 12.

Figure 6:
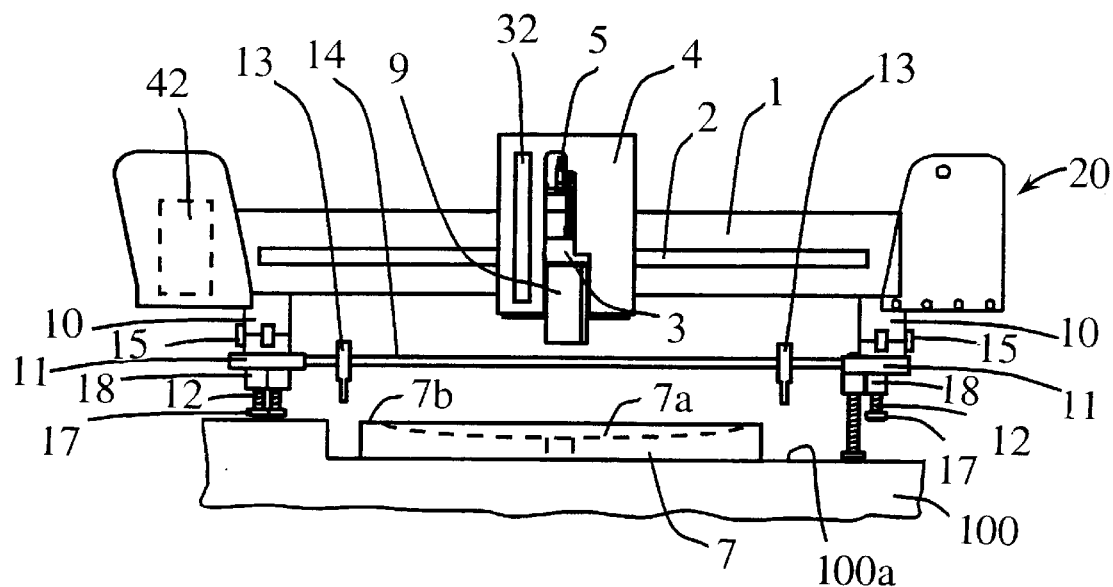
FIG. 6 is a side view of a portable surface inspector in accordance with a preferred embodiment of the present invention.

(4) The portable surface inspector 20 can be stably set on the upper surface 100a of the lapping machine 100 by independently adjusting the effective length L of the plurality of supporting legs 12 even if the upper surface 100a is stepped or inclined as shown in FIG. 6.

(5) The operator can easily set the portable surface inspector 20 on the lapping machine 100 without having to bear a heavy load by locating the second portion of the inspector 20 relative to the lapping plate 7 to set it on the lapping machine 100 and thereafter setting the first portion of the inspector 20 on the second portion to fix the first portion to the second portion. If a plurality of second portions are made available, the operator can locate the plurality of second portions relative to a plurality of lapping plates 7 and set a single first portion on and fix it to the plurality of second portions successively to inspect processing surfaces of the plurality of lapping plates 7 successively. In this case, inspection cost is reduced because a plurality of inexpensive second portions share an expensive first portion.

Procedure for inspecting the processing surface 7a of the lapping plate 7 with the portable surface inspector 20 will be described, while referring to FIG. 5.

The operator starts the control program and inputs inspection conditions such as start point, end point, inspection pitch, etc.

The X-axis motor 42 starts and the X-axis table 4 moves from the home position to the start point. X-axis coordinate Xn of the non-contact displacement sensor 9 is input from the X-axis linear scale 2 to the counter circuit 51. When the X-axis table 4 reaches the start point, a trigger signal is input from the counter circuit 51 to the displacement data input circuit 52 to start the inspection.

The non-contact displacement sensor 9 measures the distance in the direction of Z-axis between itself and the processing surface 7a of the lapping plate 7, the servo controller 56 feedback controls the Z-axis motor 5, and the Z-axis stage 3 moves to a position where the distance in the direction of the Z-axis between the non-contact displacement sensor 9 and the processing surface 7a of the lapping plate 7 becomes the optimum measuring distance of the non-contact displacement sensor 9 (about 5 mm in the case of a laser sensor with the measurable distance of 5±0.3 mm). The non-contact displacement sensor 9 measures the distance Zi in the direction of the Z-axis between itself and the processing surface 7a of the lapping plate 7. The measured datum Zi is input from the non-contact displacement sensor 9 to the displacement data input circuit 52. Z-axis coordinate datum Zs of the non-contact displacement sensor 9 is input from the Z-axis linear scale 32 to the displacement data input circuit 52.

The measured datum Zi by the non-contact displacement sensor 9 and the Z-axis coordinate datum Zs of the non-contact displacement sensor 9 are sent from the displacement data input circuit 52 to the data processing unit 53. The X-axis coordinate datum Xn of the non-contact displacement sensor 9 is sent from the counter circuit 51 to the data processing unit 53.

Deflection correction data $\Delta z$ for correcting the Z-axis coordinate data Zs of the non-contact displacement sensor 9 based on the deflection of the guide rail 1 in the direction of Z-axis due to the dead weight of the guide rail 1 and the weight of the X-axis table 4 are stored in the displacement correction data memory 54 beforehand. Deflection correction datum $\Delta z$ is sent from the displacement correction data memory 54 to the data processing unit 53.

Figure 7:
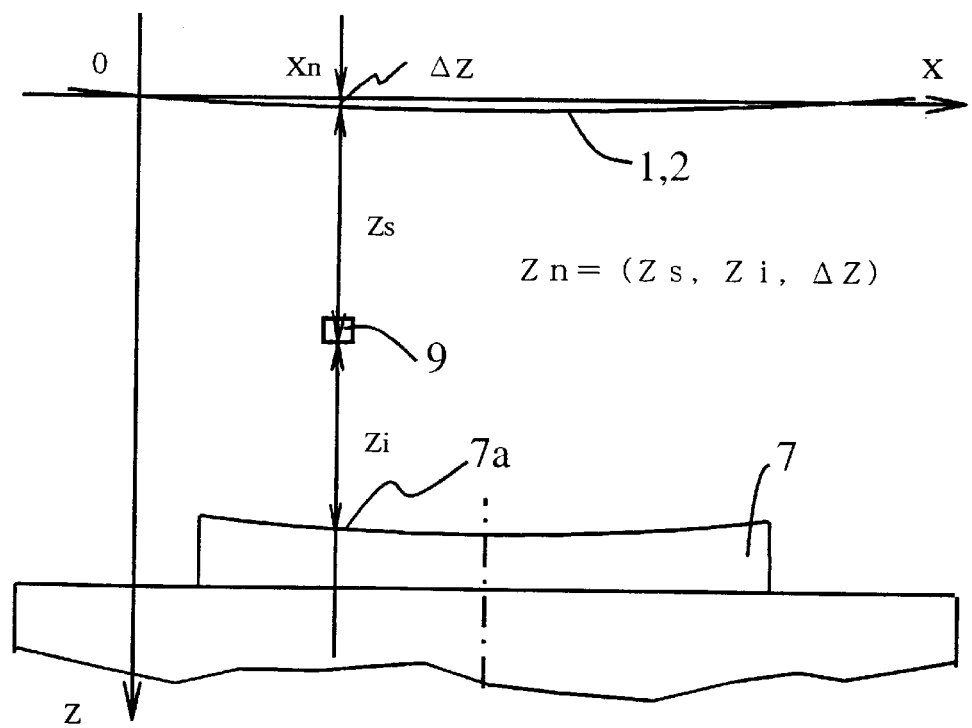
FIG. 7 is a diagram for explaining calculation process of Z-axis coordinate Zn.

As shown in FIG. 7, the data processing unit 53 calculates the Z-axis coordinate Zn of the measured point of the processing surface 7a based on the measured datum Zi, the Z-axis coordinate Zs of the non-contact displacement sensor 9 and the deflection correction datum $\Delta z$.

The data processing unit 53 stores the Z-axis coordinate Zn and the X-axis coordinate Xn of the measured point of the processing surface 7a in the surface shape data memory 55.

The X-axis table 4 moves to the next measured point on the diameter line of the lapping plate 7, measurement of the processing surface 7a is carried out, the data processing unit 53 calculates the Z-axis coordinate Zn of the measured point, and stores the calculated Z-axis coordinate Zn and the X-axis coordinate Xn of the measured point in the surface shape data memory 55.

Movement of the X-axis table 4, measurement of the processing surface 7a, calculation of the Z-axis coordinate Zn of the measured point, and storage of the Z-axis coordinate Zn and the X-axis coordinate Xn of the measured point in the surface shape data memory 55 are repeated to accumulate surface shape data of the processing surface 7a along a diameter line of the lapping plate 7 in the surface shape data memory 55.

The lapping plate 7 is rotated to measure the shape of the processing surface 7a along a plurality of diameter lines of the lapping plate 7, thereby accumulating surface shape data of the processing surface 7a along a plurality of diameter lines of the lapping plate 7 in the surface shape data memory 55. For example, the lapping plate is rotated by 45° at a time to measure the shape of the processing surface 7a along four diameter lines of the lapping plate 7, thereby accumulating surface shape data of the processing surface 7a along four diameter lines of the lapping plate 7 in the surface shape data memory 55.

The portable surface inspector 20 has the following advantages with respect to the measurement of the shape of the processing surface 7a.

(1) The measuring accuracy of the portable surface inspector 20 is very high because the deflection in the direction of the Z-axis of the straight hollow guide rail 1 made of a material with a large Young's modulus per unit mass such as alumina ceramic, silicon carbide, etc. is very small.

(2) The measuring accuracy of the portable surface inspector 20 remains high even if the ambient temperature varies because the coefficient of linear expansion of a ceramic such as alumina ceramic, silicon carbide, etc. is very small.

(3) Vibration due to rolling or stick slip, which is liable to occur in an anti-friction bearing, does not occur during the movement of X-axis table 4 because the X-axis table 4 is supported by the guide rail 1 through the air bearing 41. Therefore, the measuring accuracy of the portable surface inspector 20 is high.

(4) Sliding friction between the X-axis table 4 and the guide rail 1 is small because the X-axis table 4 is supported by the guide rail 1 through the air bearing 41. Therefore, heat generation by the X-axis motor 42 is small and thermal deflection of the guide rail 1 is small. Therefore, the measuring accuracy of the portable surface inspector 20 is high.

(5). The sliding surface between the X-axis table 4 and the guide rail 1 incurs little wear because the X-axis table 4 is supported by the guide rail 1 through the air bearing 41. Therefore, the measuring accuracy of the portable surface inspector 20 remains high for a long time.

(6) The distance in the direction of the Z-axis between the non-contact displacement sensor 9 and the processing surface 7a of the lapping plate 7 is measured accurately because the distance in the direction of the Z-axis between the non-contact displacement sensor 9 and the processing surface 7a of the lapping plate 7 is kept at an optimum measuring distance of the non-contact displacement sensor 9.

Z-axis coordinate Zs of the non-contact displacement sensor 9 is corrected based on the deflection in the direction of the Z-axis of the guide rail 1. Therefore, the microscopic shape of the processing surface 7a of the lapping plate 7 can be accurately inspected.

(7) The macroscopic shape of the processing surface 7a of the lapping plate 7 can be accurately inspected because the shape of the processing surface 7a is accurately measured at a plurality of points along a plurality of diameter lines of the lapping plate 7.

(8) The measurement of the shape of the processing surface 7a along a diameter line of the lapping plate 7 is carried out automatically under the direction of a control program.

Therefore, the macroscopic shape and the microscopic shape of the processing surface 7a of the lapping plate 7 can be easily and accurately inspected.

The processing of the surface shape data of the processing surface 7a stored in the surface shape data memory 55 will be described.

Figure 8:
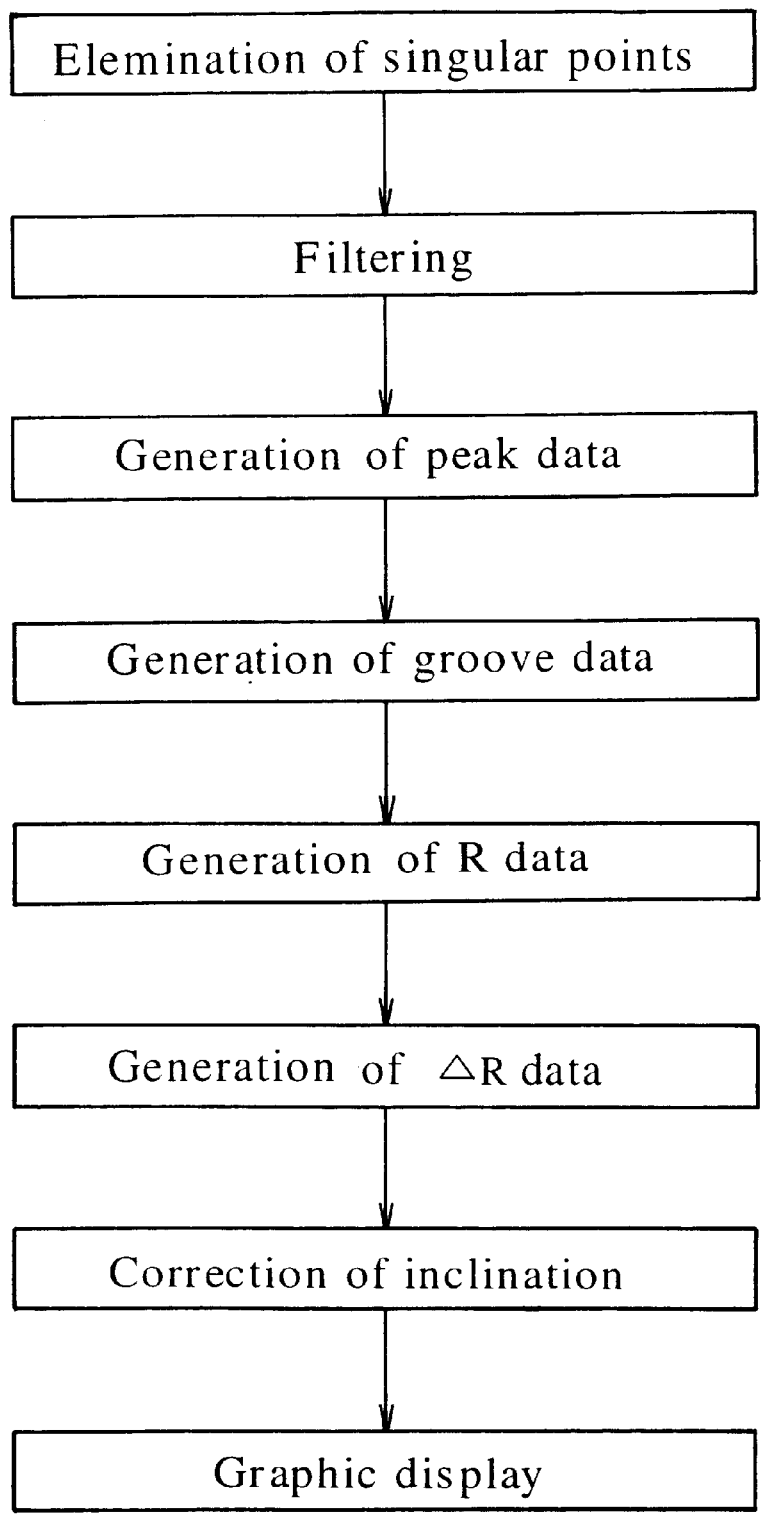
FIG. 8 is a flow chart of processing procedure conducted by a portable surface inspector in accordance with a preferred embodiment of the present invention.

The data processing unit 53 receives the processing surface 7a surface shape data to be processed from the surface shape data memory 55. Surface shape data processing is carried out in accordance with the procedure shown in FIG. 8. The procedure of the surface shape data processing will be described in detail.

(1) Elimination of Singular Points

Figure 9:
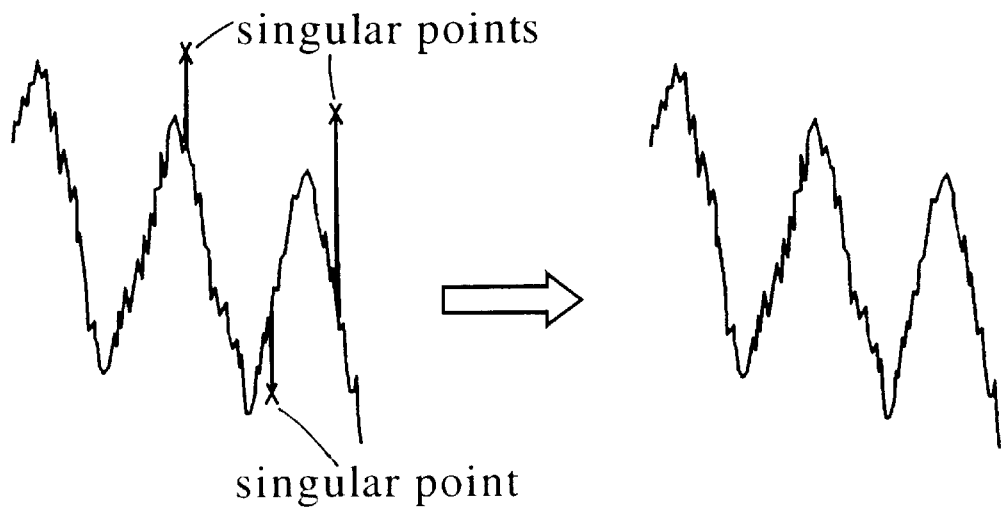
FIG. 9 is a diagram for explaining elimination of singular points.

As shown in FIG. 9, a Z-axis coordinate datum Zn which is far larger or smaller than the mean value of the neighboring Z-axis coordinate data Zn is deemed to be a singular point to be eliminated. Thus, error of measurement due to irregular reflection of laser beam from the non-contact displacement sensor 9, dust adhering to the processing surface 7a, etc. is eliminated. The number of the neighboring Z-axis coordinate data Zn, threshold between the singular point and the normal point, etc. can be input by the operator.

(2) Filtering

Figure 10:
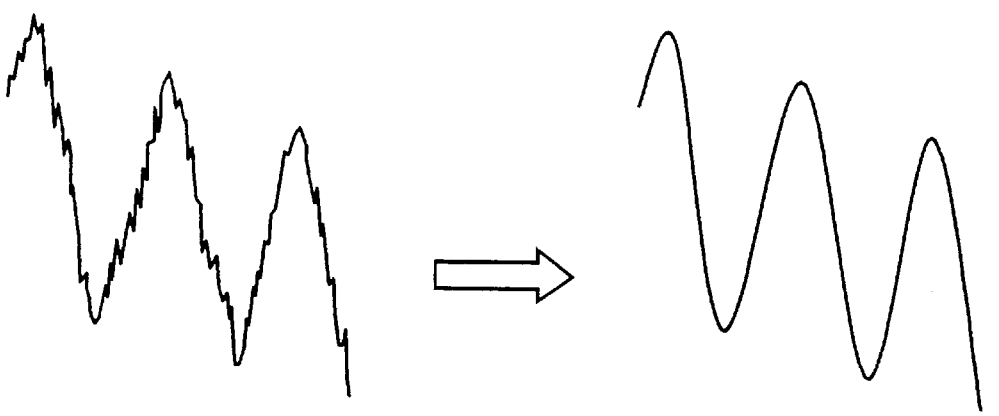
FIG. 10 is a diagram for explaining a filtering process.

As shown in FIG. 10, Z-axis coordinate data free from singular points are passed through an FIR type low-pass filter to eliminate high frequency noise. Cutoff frequency can be set by the operator.

(3) Generation of Peak Data

Figure 11:
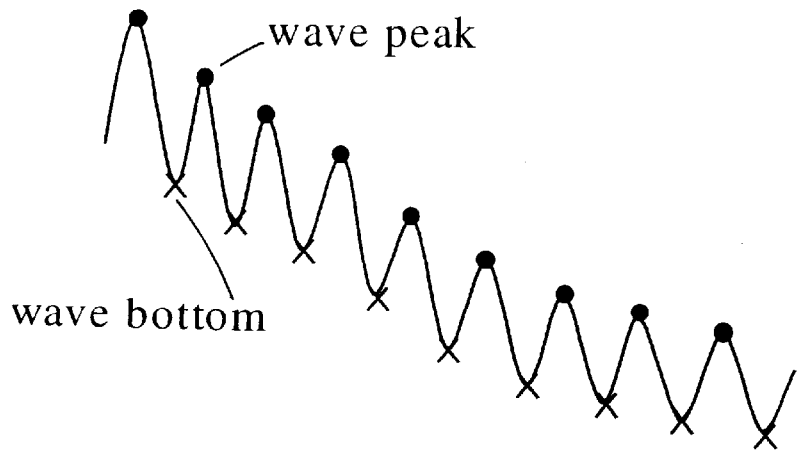
FIG. 11 is a diagram for explaining generation of wave peak and wave bottom data.

As shown in FIG. 11, peaks and bottoms of regular waves of the Z-axis data Zn free from high frequency noise are detected and stored in the surface shape data memory 55 as wave peak data and wave bottom data.

The shape of the surface of the lapping plate 7 abutting against the object to be processed can be ascertained by calculating an envelope of the wave peaks.

The processing accuracy of the machine tool that processed the processing surface 7a can be ascertained by calculating an envelope of the wave bottoms.

(4) Generation of Groove Data

Figure 12:
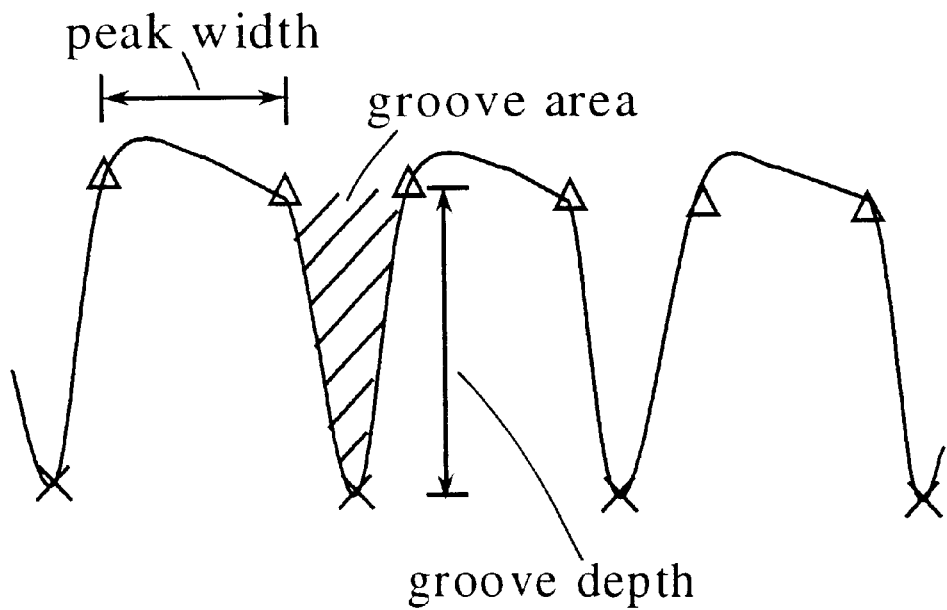
FIG. 12 is a diagram for explaining generation of groove shape data.

As shown in FIG. 12, the peak width, groove depth and groove area of the each wave of the Z-axis coordinate data Zn free from high frequency noise are calculated and stored in the surface shape data memory 55 as groove shape data.

The peak width of each wave of the spiral groove formed on the processing surface 7a increases and groove depth of each wave of the spiral groove formed on the processing surface 7a decreases with continuing use of the lapping plate. Therefore, the degree of the wear of the lapping plate 7 and the optimum time for reworking the processing surface 7a or replacing the lapping plate 7 can be ascertained based on the groove shape data.

(5) Generation of R Data

The radius R of the processing surface 7a is calculated based on the wave peak data and stored in the surface shape data memory 55 as R data.

Figure 13:
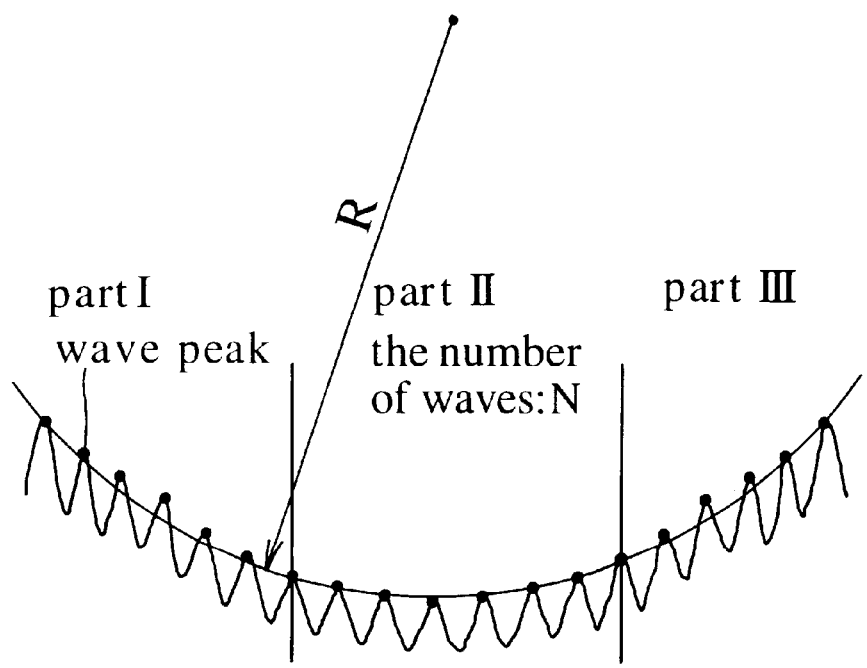
FIG. 13 is a diagram for explaining generation of R data.

The procedure for generating R data will be described based on FIG. 13. The wave peak data are divided along the X-axis into three equal parts, i.e. part I, part II and part III. A wave peak datum is selected from each part and the relation among the three data (concave, convex, straight) is detected. Another wave peak datum is selected from each part and the relation among the three data is detected. The above procedure is repeated N times (N is the number of wave peak data in each part). The most numerous shape is determined to be the shape of the wave peak data.

When the shape of the wave peak data is concave or convex, a wave peak datum is selected from each part and the circle formed by the three wave peak data is calculated.

Another wave peak datum is selected from each part and the circle formed by the three wave peak data is calculated. The above procedure is repeated n times. When the calculated circle has the radius larger than a predetermined value r, the shape of the wave data is deemed to be straight and the repetition of the calculation of the circle is stopped. After the completion of n times calculations, the mean radius of n circles and the mean coordinate of the centers of n circles are calculated and determined to be the radius R and the coordinate of the center of the circle formed by the processing surface 7a. The number of the repetitions n and the predetermined value r can be set by the operator.

When the shape of the wave peak data is straight, the straight line approximated by least square method based on the whole wave peak data is determined to be the shape of the processing surface 7a.

The processing surface 7a is processed so as to achieve a predetermined radius R. Therefore, the processing accuracy of the machine tool that processed the processing surface 7a can be ascertained by measuring the shape of the processing surface 7a after the completion of the processing of the processing surface 7a to calculate the radius R.

The R data can be utilized for management of the processing surface 7a.

(6) Generation of ΔR Data

Figure 14:
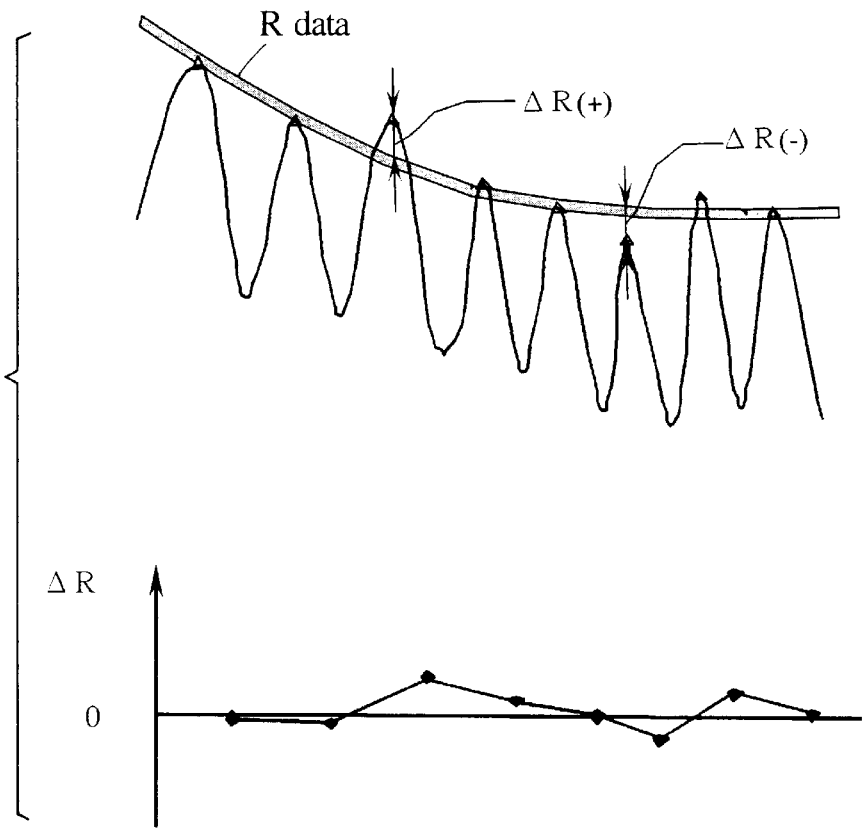
FIG. 14 is a diagram for explaining generation of ΔR data.

As shown in FIG. 14, differences in the direction of Z-axis ΔR between the radius R of the processing surface 7a calculated based on the wave peak data and wave peak data are calculated and stored in the surface shape data memory 55 as ΔR data.

Irregularity of the processing surface 7a can be ascertained from the ΔR data.

Once the allowable range of ΔR has been set, management of the processing surface 7a can be carried out based on the ΔR data.

Difference in the processing accuracy of the lapping plate 7 due to difference in the radial position of the processing surface 7a can be ascertained based on the distribution of ΔR in the direction of the X-axis.

(7) Correction of Inclination

Figure 15:
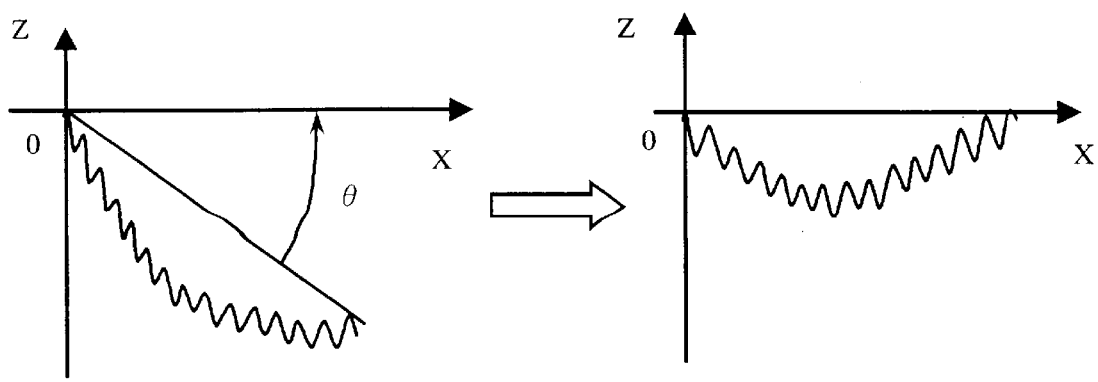
FIG. 15 is a diagram for explaining an inclination correction process.

As shown in FIG. 15, the Z-axis data Zn free from high frequency noise are generally rotated to eliminate inclination of the data as a whole and thereby make the Z-axis data Zn easier to observe. Since correction of inclination makes precise adjustment of the parallel relation between the straight guide rail 1 and the lapping plate 7 unnecessary, it shortens the time needed to adjust the parallel relation between them.

(8) Graphic Display

Figure 16:
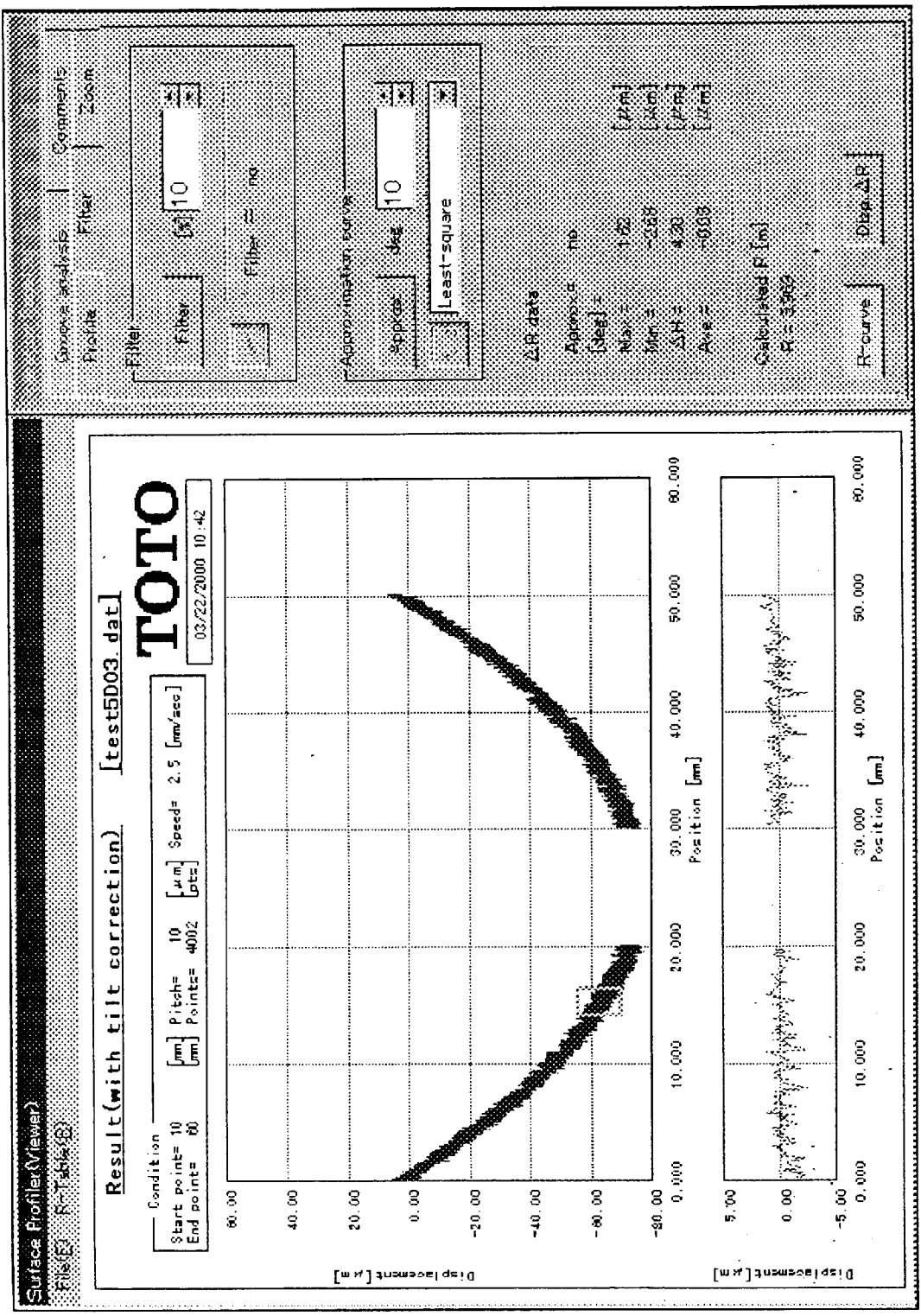
FIG. 16 shows an example of displaying measured surface shape data in the form of graphs.
Figure 17:
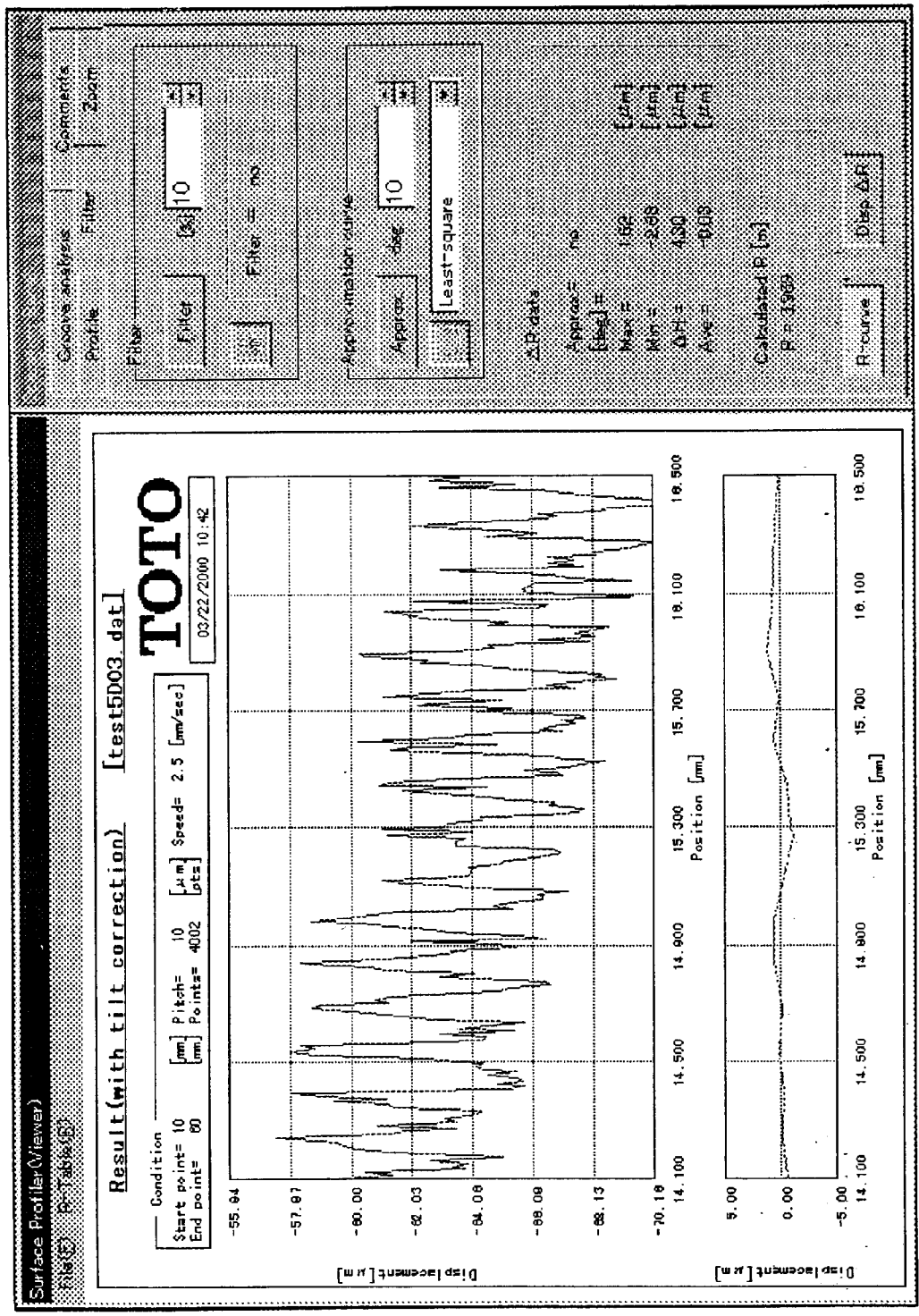
FIG. 17 shows another example of displaying measured surface shape data in the form of graphs.
Figure 18:
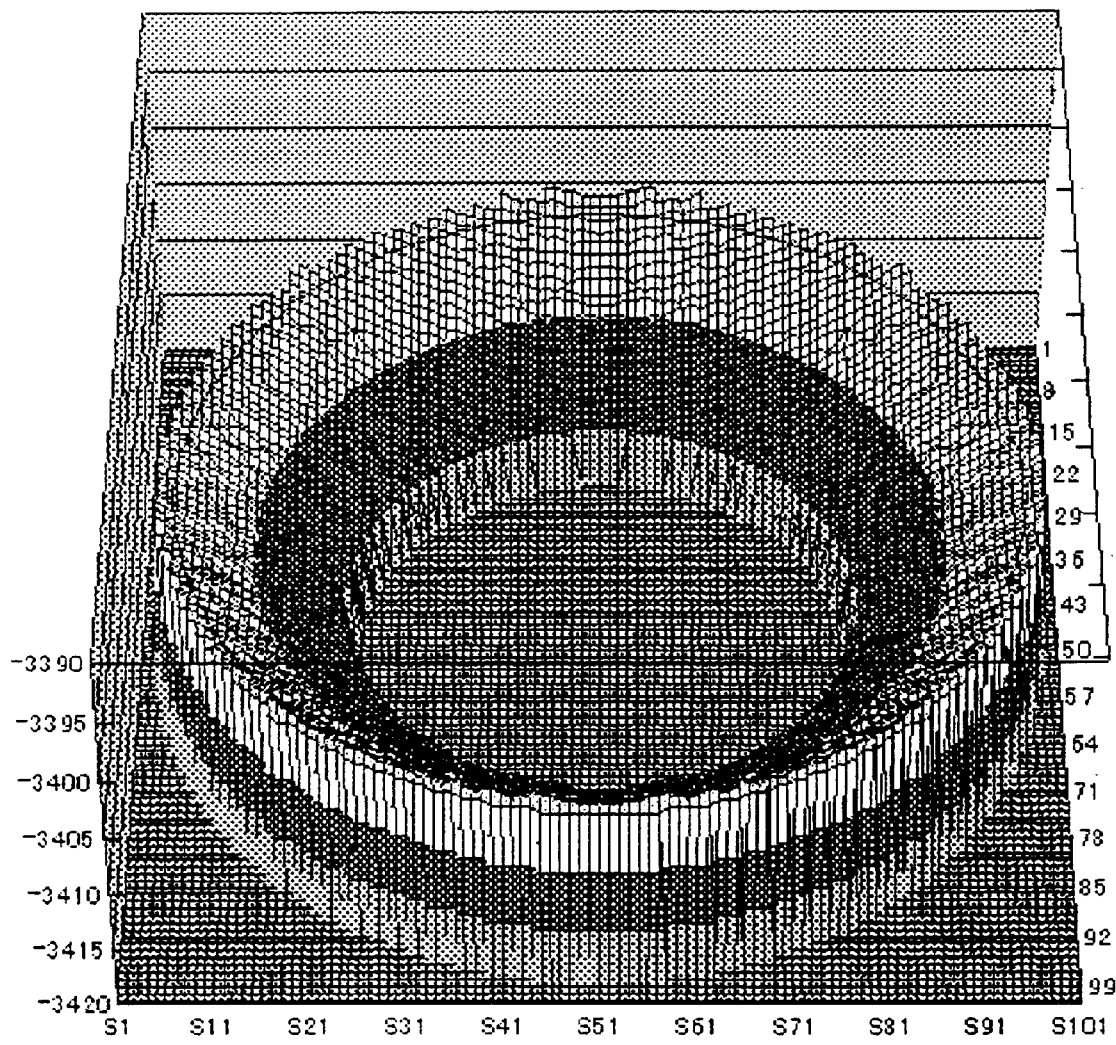
FIG. 18 shows another example of displaying measured surface shape data in the form of graphs.

As shown in FIGS. 16 to 18, the above-described various data are displayed graphically on the display 57 so that the operator can visually ascertain the condition of the processing surface 7a of the lapping plate 7.

FIG. 16 graphically shows the shape of the processing surface 7a along a diameter line. The upper graph shows the distribution of the Z-axis coordinate data Zn free from high frequency noise in the direction of the X-axis and the lower graph shows the distribution of ΔR in the direction of the X-axis. Inspection conditions (start point, end point, inspection pitch, number of inspected points, inspection speed), radius R, the maximum ΔR, the minimum ΔR, and the difference ΔH between the maximum ΔR and the minimum ΔR are displayed on the right side of the screen. Difference between the optimum shape and the actual shape of the processing surface 7a of the lapping plate 7 can be easily ascertained by observing the graphic display of radius R, the maximum ΔR, the minimum ΔR, and the difference ΔH between the maximum ΔR and the minimum ΔR.

The upper part of FIG. 17 shows a fragmentary enlarged view of the graphs of FIG. 16.

FIG. 18 shows the three dimensional shape of the processing surface 7a obtained by combining the measured results along a plurality of diameter lines.

Figure 19:
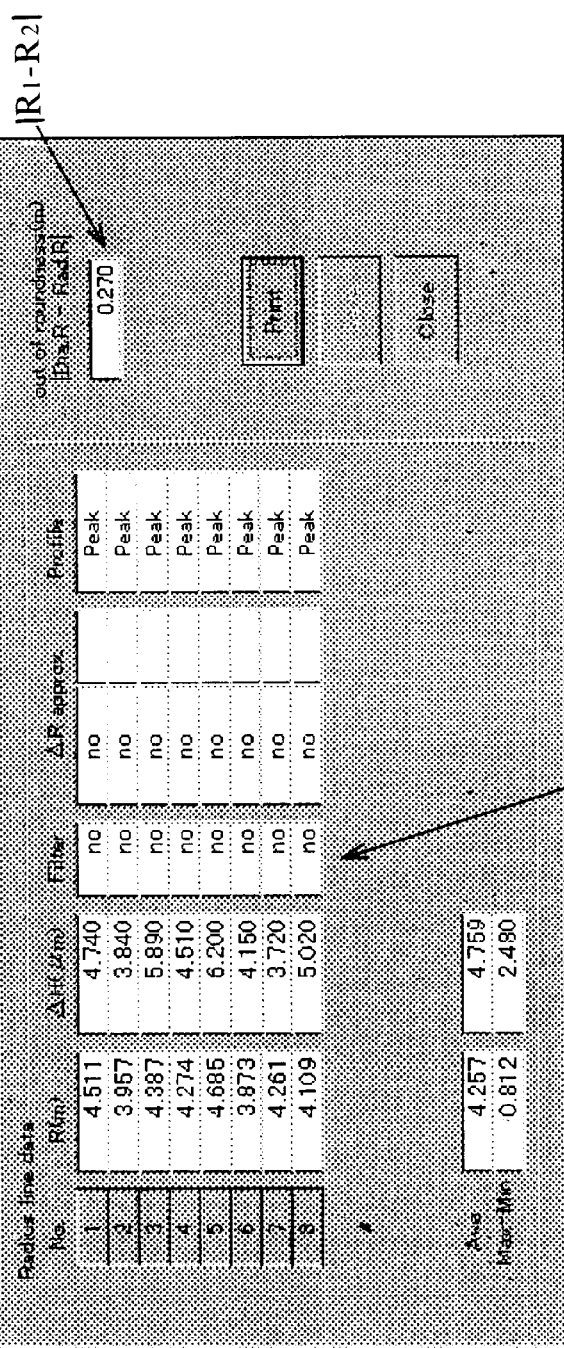
FIG. 19 shows an example of displaying measured surface shape data numerically.

FIG. 19 shows a numerical display of various data. Based on the numerical display, it can be easily ascertained whether or not the various data are within allowable ranges. R, ΔR and the difference ΔH between the maximum ΔR and the minimum ΔR are particularly important for managing the processing accuracy of the lapping plate 7.

Figure 20:
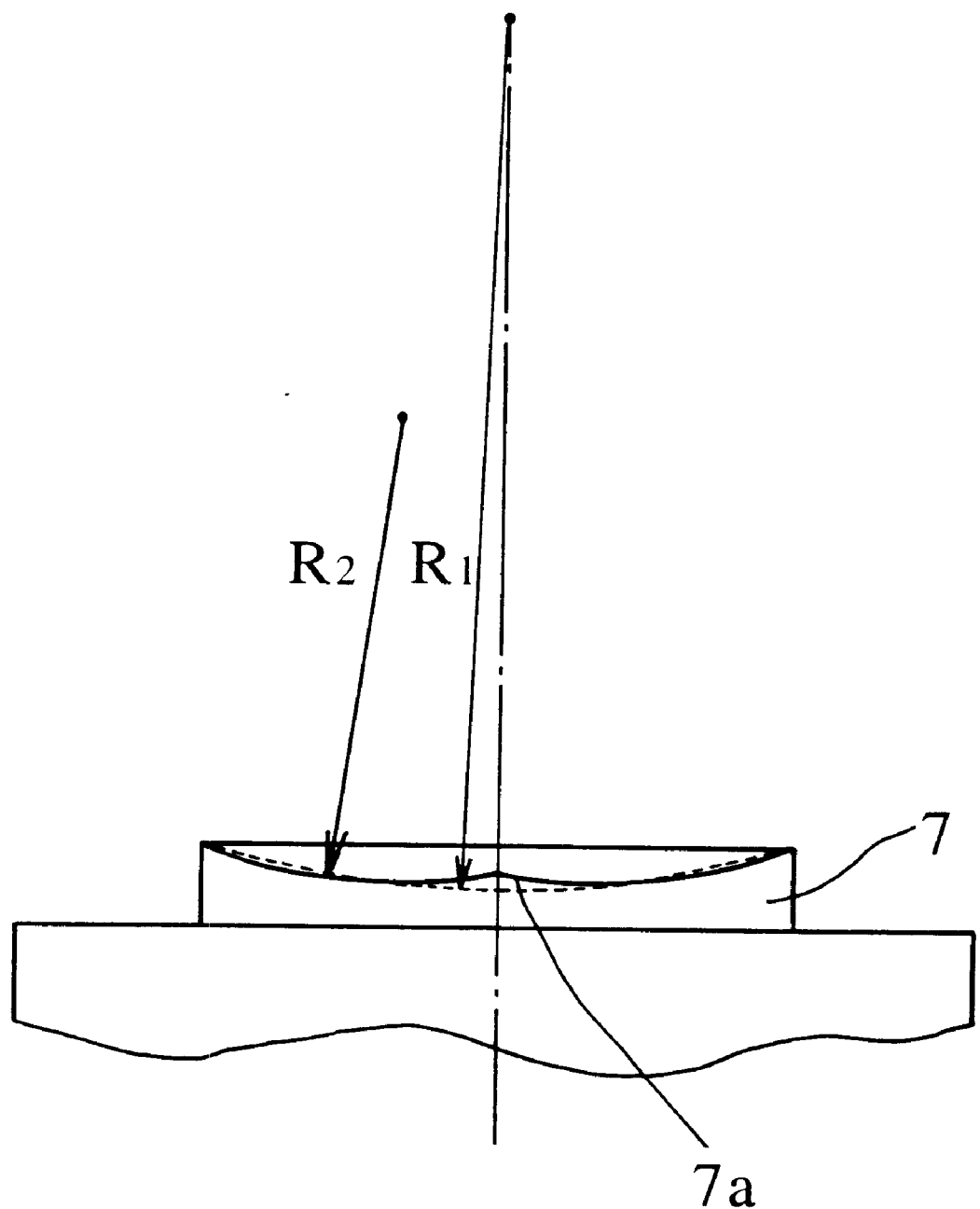
FIG. 20 shows a cross sectional view of a lapping plate.

It is desirable to display not only the radius R obtained from the data over a diameter of the lapping plate 7 but also the radius R obtained from the data over a radius of the lapping plate 7. The machine tool for processing the processing surface 7a rotates the lapping plate 7 to move the cutting blade radially, thereby processing the processing surface 7a. Therefore, the processing accuracy of the machine tool can be ascertained by comparing the radius R obtained from the data over a diameter of the lapping plate 7 with the radius R obtained from the data over a radius of the lapping plate 7. For example, as shown in FIG. 20, the processing surface 7a does not become spherical when the processing accuracy of the machine tool is low. In this case, the radius R1 obtained from the data over a diameter does not coincide with the radius R2 obtained from the data over a radius. If they coincide with each other, the processing accuracy of the machine tool is high.

It is possible to store the surface shape data of the processing surface 7a before it is used in the surface shape data memory 55, compare the surface shape data of the processing surface 7a after use has started with the surface shape data of the processing surface 7a before use, store the difference between them in the surface shape data memory 55 as wear data, and display the wear data on the display 57. This enables the time for reworking the processing surface 7a and the time for replacing the lapping plate 7 to be optimized.

It is possible to display a warning on the display 57 when the wear of the processing surface 7a exceeds a predetermined permissible level. This enables the time for reworking the processing surface 7a and the time for replacing the lapping plate 7 to be optimized.

It is possible to carry out the inspection of the surface shape of the processing surface 7a periodically and display a warning on the display 57 when the increment of the new wear data from the last wear data exceeds a predetermined permissible level. This enables the time for reworking the processing surface 7a and the time for replacing the lapping plate 7 to be optimized.

The Z-axis coordinate Zs of the non-contact displacement sensor 9 at the home position when the portable surface inspector 20 is set on the upper surface 100a of the lapping machine 100 can be marked on the support table 11. Interference between the non-contact displacement sensor 9 and the processing surface 7a during the setting operation of the first portion of the portable surface inspector 20 on the second portion of the portable surface inspector 20 can be prevented by adjusting the effective length L of the support legs 12 so that the mark is located higher than the processing surface 7a.

The Z-axis coordinate Zs of the non-contact displacement sensor 9 at the home position when the portable surface inspector 20 is set on the upper surface 100a of the lapping machine 100 can be marked on the locating jigs 13. Interference between the non-contact displacement sensor 9 and the processing surface 7a during the setting operation of the first portion of the portable surface inspector 20 on the second portion of the portable surface inspector 20 can be prevented by adjusting the effective length L of the support legs 12 so that the mark is located higher than the processing surface 7a.

The portable surface inspector 20 can be used for the inspection of not only the processing surface 7a of the lapping plate 7 but also surfaces of various flat bodies such as mirrors, dies, lenses, ceramic plates, etc.

While the present invention has been described with reference to preferred embodiments, one of ordinary skill in the art will recognize that modifications and improvements may be made while remaining within the spirit and scope of the present invention. The scope of the invention is determined solely by the appended claims.

What is claimed is:

1. A portable surface inspector comprising a straight guide rail, a table engaging the guide rail to be movable along the guide rail, a stage engaging the table to be movable in the direction of a transverse axis crossing at right angles with the longitudinal axis of the guide rail, a non-contact displacement sensor fixed to the stage, a first driving means for driving the table, a first coordinate detecting means for detecting the longitudinal axis coordinate of the non-contact displacement sensor, a second driving means for driving the stage, a second coordinate detecting means for detecting the transverse axis coordinate of the non-contact displacement sensor, and a coordinate correcting means for correcting the transverse axis coordinate of the non-contact displacement sensor with the deflection in the direction of the transverse axis of the guide rail.

2. A portable surface inspector of claim 1, further comprising a constant distance keeping means for keeping the distance in the direction of the transverse axis between the non-contact displacement sensor and the inspected surface constant.

3. A portable surface inspector of claim 1, wherein the non-contact displacement sensor is a laser sensor.

4. A portable surface inspector of claim 1, further comprising an air bearing supporting the table.

5. A portable surface inspector of claim 1, wherein the guide rail is made of ceramic.

6. A portable surface inspector of claim 1, further comprising a measured surface shape data storing means and a measured surface data analyzing means.

7. A portable surface inspector of claim 6, further comprising an initial surface shape data storing means for storing the initial surface shape data of the inspected surface and a wear detecting means for detecting the wear of the inspected surface based on the initial surface shape data and the measured surface shape data.

8. A portable surface inspector of claim 7, further comprising a first warning means for displaying a warning when the wear of the inspected surface exceeds a permissible level.

9. A portable surface inspector of claim 7, further comprising a second warning means for displaying a warning when increment of the wear from that at the last inspection exceeds a permissible level.

10. A portable surface inspector of claim 1, further comprising a support member for the guide rail and a support member locating means for locating the support member relative to the surface to be inspected.

11. A portable surface inspector of claim 10, wherein the guide rail is connected to the support member to be detachable.

12. A portable surface inspector of claim 10, wherein the support member is provided with a plurality of legs of adjustable length.

13. A portable surface inspector of claim 12, wherein the transverse axis coordinate of the non-contact displacement sensor at the home position is marked on the support member.

14. A portable surface inspector of claim 12, wherein the transverse axis coordinate of the non-contact displacement sensor at the home position is marked on the support member locating means.

15. A method for inspecting the surface shape of a flat body comprising the steps of:
    moving a non-contact displacement sensor movable along a straight guide rail to a first position in the direction of the longitudinal axis of the guide rail;
    moving the non-contact displacement sensor to a second position in the direction of a transverse axis crossing at right angles with the longitudinal axis of the guide rail;
    measuring the distance in the direction of the transverse axis between the non-contact displacement sensor and the surface to be inspected;
    detecting the longitudinal axis coordinate of the first position of the non-contact displacement sensor;
    detecting the transverse axis coordinate of the second position of the non-contact displacement sensor;
    calculating the transverse axis coordinate of the inspected point of the inspected surface based on the distance in the direction of the transverse axis between the non-contact displacement sensor and the inspected surface, the transverse axis coordinate of the second position of the non-contact displacement sensor, and a correction value for correcting the transverse axis coordinate of the second position of the non-contact displacement sensor based on the deflection of the guide rail in the direction of the transverse axis; and
    carrying out the above steps at various different first positions of the non-contact displacement sensor.

16. A method for inspecting the surface shape of a flat body of claim 15, wherein the distance in the direction of the transverse axis between the non-contact displacement sensor and the surface to be inspected is kept constant.

17. A method for inspecting the surface shape of a flat body of claim 15, further comprising the steps of:
    calculating the circular arc of the inspected surface based on the measured longitudinal axis coordinates and the transverse axis coordinates of a plurality of measured points; and
    displaying the radius R of the calculated circular arc.

18. A method for inspecting the surface shape of a flat body of claim 15, further comprising the steps of:
    calculating the circular arc of the inspected surface based on the measured longitudinal axis coordinates and the transverse axis coordinates of a plurality of measured points;
    calculating differences $\Delta R$ in the direction of the transverse axis between the calculated circular arc and the measured points; and
    displaying the differences $\Delta R$.

19. A method for inspecting the surface shape of a flat body of claim 15, further comprising the steps of:
    calculating the circular arc of the inspected surface based on the measured longitudinal axis coordinates and the transverse axis coordinates of a plurality of measured points;
    calculating differences $\Delta R$ in the direction of the transverse axis between the calculated circular arc and the measured points;
    calculating the difference $\Delta H$ between the maximum $\Delta R$ and the minimum $\Delta R$; and
    displaying the difference $\Delta H$.

20. A method for inspecting the surface shape of a flat body of claim 15, wherein the inspected surface is symmetrical around a rotation axis; and further comprising the steps of:
    calculating the circular arc of the inspected surface based on the measured longitudinal axis coordinates and the transverse axis coordinates of a plurality of measured points over a diameter of the inspected surface;
    calculating the circular arc of the inspected surface based on the measured longitudinal axis coordinates and the transverse axis coordinates of a plurality of measured points over a radius of the inspected surface; and
    displaying the radius R of the circular arc calculated based on the measured points over the diameter and the radius R of the circular arc calculated based on the measured points over the radius.

21. A method for inspecting the surface shape of a flat body of claim 15, wherein the inspected surface is symmetrical around a rotation axis; and further comprising the steps of:
    calculating the circular arc of the inspected surface based on the measured longitudinal axis coordinates and the transverse axis coordinates of a plurality of measured points over a diameter of the inspected surface;
    calculating the circular arc of the inspected surface based on the measured longitudinal axis coordinates and the transverse axis coordinates of a plurality of measured points over a radius of the inspected surface; and
    displaying the difference between the radius R of the circular arc calculated based on the measured points over the diameter and the radius R of the circular arc calculated based on the measured points over the radius.

* * * * *